(12) United States Patent
Tsai

(10) Patent No.: US 7,586,354 B1
(45) Date of Patent: Sep. 8, 2009

(54) CLOCK PIN SETTING AND CLOCK DRIVING CIRCUIT

(75) Inventor: Sheng-Yuan Tsai, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 12/276,871

(22) Filed: Nov. 24, 2008

(30) Foreign Application Priority Data

Sep. 22, 2008 (TW) .............................. 97136337 A

(51) Int. Cl.
*G06F 1/04* (2006.01)
(52) U.S. Cl. ....................... 327/291; 327/172
(58) Field of Classification Search ........................ None
See application file for complete search history.

(56) References Cited

U.S. PATENT DOCUMENTS

| | | | | |
|---|---|---|---|---|
| 3,487,167 A * | 12/1969 | Riggin et al. | ................ | 348/530 |
| 3,592,961 A * | 7/1971 | Grace | .......................... | 348/499 |
| 4,068,669 A * | 1/1978 | Niemi | .......................... | 607/63 |
| 4,236,649 A * | 12/1980 | Fellner et al. | ................. | 221/90 |
| 4,255,789 A * | 3/1981 | Hartford et al. | ............. | 701/108 |
| 4,317,070 A * | 2/1982 | Tokuda et al. | ............. | 315/241 P |
| 4,396,828 A * | 8/1983 | Dino et al. | ..................... | 377/6 |
| 5,268,594 A * | 12/1993 | Huang | ......................... | 327/172 |
| 5,920,176 A * | 7/1999 | Blackburn et al. | .......... | 318/701 |
| 5,926,050 A * | 7/1999 | Proebsting | ................... | 327/170 |
| 6,218,893 B1* | 4/2001 | Noguchi | ..................... | 327/540 |
| 6,653,873 B1* | 11/2003 | Nguyen | ...................... | 327/112 |
| 2007/0247879 A1* | 10/2007 | Yang | ............................ | 363/49 |

\* cited by examiner

Primary Examiner—Cassandra Cox
(74) Attorney, Agent, or Firm—CKC & Partners Co., Ltd.

(57) ABSTRACT

A pin setting circuit and a clock driving circuit are disclosed. The clock pin setting circuit sets the clock pin of the clock driving circuit. The pin setting circuit includes the double one-shot circuit and the switch circuit. The double one-shot circuit includes the first one-shot circuit and the second one-shot circuit. The first one-shot circuit receives a clock signal and generates a first control signal according to the frequency of the clock signal. The second circuit outputs a second control signal according to the first control signal generated. The switch circuit sets the clock pin to the power end or the ground end according to the second control signal.

12 Claims, 3 Drawing Sheets

|  | clock period 5 ns | clock period 10 ns |
|---|---|---|
| first control signal | logic 0 | periodic signal |
| second control signal | logic 0 | logic 1 |

CLOCK PIN SETTING AND CLOCK DRIVING CIRCUIT

RELATED APPLICATIONS

This application claims priority to Taiwan Application Serial Number 97136337, filed Sep. 22, 2008, which is herein incorporated by reference.

BACKGROUND

1. Field of Invention

The present invention relates to a pin setting circuit. More particularly, the present invention relates to the pin setting circuit for setting a clock setting pin of a chip.

2. Description of Related Art

No matter what function the individual chip performs, most chips need to be driven by the clock signal. In high-frequency chips having the phase-locked loop, the frequency of the clock signal is increased to the radio frequency. In the digital signal processing chip or the micro-control chip, the clock signals are used to process each stage of computing. Other sequential circuits require the clock signal as a reference signal.

In general, there are two ways the chip can generate a reference clock, one way is to use external crystal oscillator modules, such as Colpitts Crystal oscillator circuit; another way is to add capacitors or the parallel module crystal to the reference circuit of the chip set, such as quartz crystal.

No matter how to generate clock signals, the clock setting pin of the chip needs to be set according to the required clock frequency in order to make the chip identify the operating frequency and work correctly. For example, the clock setting pin needs to be set to logic 1 or logic 0 such that the chip can work at the correct frequency.

However, the clock setting pin may not be set correctly if the clock signal works with various frequencies, and the chip can not function properly as a result. Hence there is a need for a clock pin setting circuit which can set the clock setting pin of the chip according to the clock signal frequency in order to make the chip work correctly.

SUMMARY

According to one embodiment of the present invention, a pin setting circuit sets a clock setting pin of a chip, in which the pin setting circuit includes a double one-shot circuit and a switch circuit. The double one-shot circuit includes a first one-shot circuit and a second one-shot circuit. The first one-shot circuit receives a clock signal and generates a first control signal according to the frequency of the clock signal. The second one-shot circuit receives the first control signal outputted from the first one-shot circuit and generates a second control signal accordingly. The switch circuit is electrically connected to the clock setting pin of the chip, in which the switch circuit passes a supply voltage or a ground voltage to the clock setting pin according to the second control signal.

According to another embodiment of the present invention, a clock driving circuit includes a clock generator, a clock driving chip and a pin setting circuit. The clock generator generates a clock signal. The clock driving chip, having a clock setting pin, is driven by the clock signal. The pin setting circuit sets the clock setting pin, in which the pin setting circuit includes a double one-shot circuit and a switch circuit.

The double one-shot circuit includes a first one-shot circuit and a second one-shot circuit. The first one-shot circuit receives a clock signal and generates a first control signal according to the frequency of the clock signal. The second one-shot circuit receives the first control signal outputted from the first one-shot circuit and generates a second control signal accordingly. The switch circuit is electrically connected to the clock setting pin of the chip, in which the switch circuit passes a supply voltage or a ground voltage to the clock setting pin according to the second control signal.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 3 shows the table of control signals generated by the double one-shot circuit according to one embodiment of the present invention.

DESCRIPTION OF THE PREFERRED EMBODIMENTS

Figure 1A:
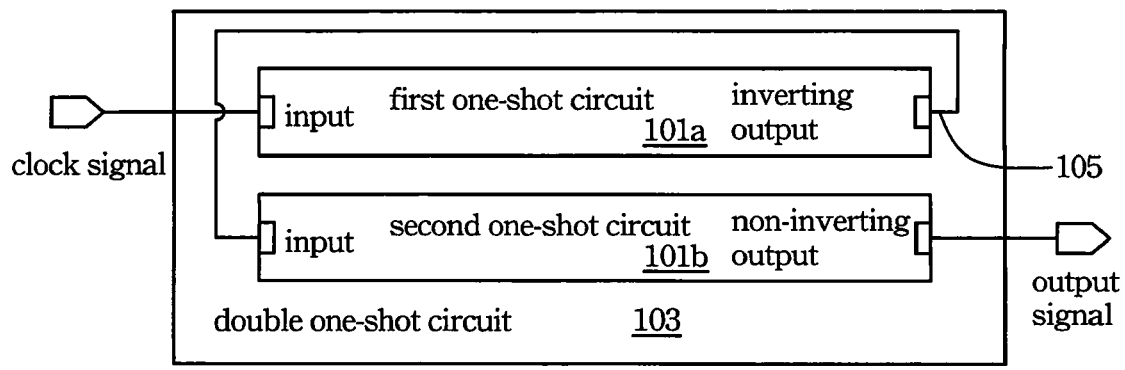
FIG. 1A shows the double one-shot circuit according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
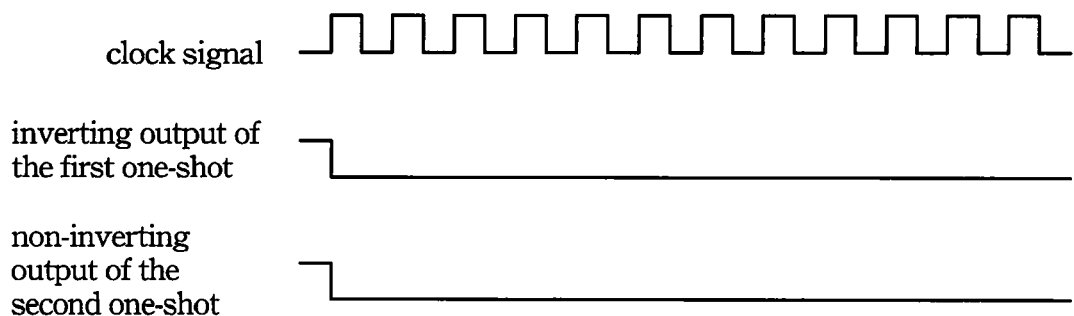
FIG. 1B shows the signal waveform generated by the double one-shot circuit based on the first period clock signal according to one embodiment of the present invention.
Figure 1C:
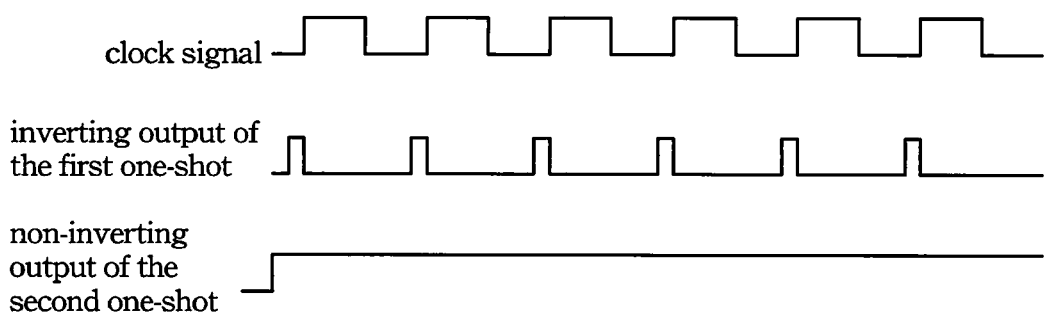
FIG. 1C shows the signal waveform generated by the double one-shot circuit with second period clock signal according to one embodiment of the present invention.

FIG. 1A, FIG. 1B and FIG. 1C show the double one-shot circuit and the signal waveforms generated by the double one-shot circuit according to one embodiment of the present invention. The double one-shot circuit 103 shown in FIG. 1A includes a first one-shot circuit 101a and a second one-shot circuit 101b. The first one-shot circuit 101a of the double one-shot circuit 103 receives a clock signal and generates an inverting output signal 105 according to the frequency of the clock signal. The second one-shot circuit 101b receives the inverting output signal 105 outputted from the first one-shot circuit 101a and generates a non-inverting output signal accordingly.

According to the characteristic of the one-shot circuit (another name is monostable circuit), the one shot-circuit generates a pulse with a specified width if the one-shot circuit is triggered only once and is not triggered again within the delay time (the delay time including the RC time constant and the recovery time of the one-shot circuit) of the one-shot circuit. On the contrary, if the one-shot circuit is triggered twice within the delay time, the one-shot circuit outputs logic 0 or logic 1 instead of a pulse.

The clock signal of the embodiment shown in FIG. 1B works with the first period. If the delay time of the first one-shot circuit 101a is designed greater than the first period of the clock signal, which means that the first one-shot circuit 101a is triggered at least twice by the clock signal within the delay time of the first one-shot circuit 101a, then the inverting output signal 105 generated by the first one-shot circuit 101a is logic 0, and the second one-shot circuit 101b receiving the logic 0 also generates logic 0 at its non-inverting output.

The clock signal of the embodiment shown in FIG. 1C works with the second period which is longer than the first period. If the delay time of the first one-shot circuit 101a is designed less than the second period, which means that the first one-shot circuit 101a is triggered merely once by the clock signal within the delay time of the first one-shot circuit 101a, then the first one-shot circuit 101a generates a periodic signal, and the second one-shot circuit 101b receiving the periodic signal generates logic 1 at its non-inverting output.

Figure 2:
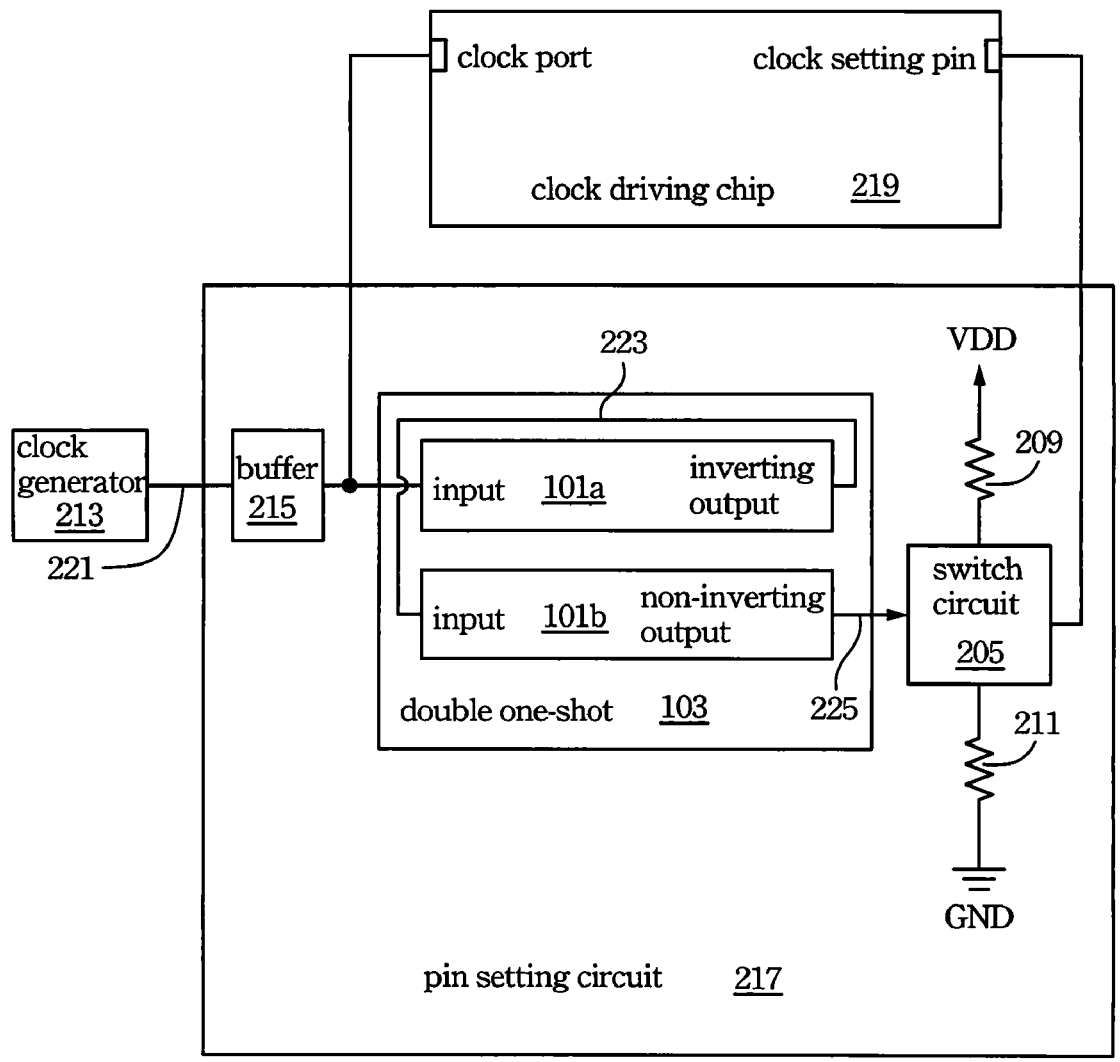
FIG. 2 shows a clock driving circuit according to one embodiment of the present invention.

FIG. 2 shows a clock driving circuit according to one embodiment of the present invention. The clock driving circuit includes a clock generator 213, a pin setting circuit 217 and a clock driving chip 219. The clock generator 213 generates a clock signal 221 which drives the clock driving chip 219, in which the clock driving chip 219 has a clock setting pin. The pin setting circuit 217 passes the supply voltage VDD or the ground voltage GND to the clock setting pin of the chip 219 according to the frequency of the clock signal.

The pin setting circuit 217 includes a double one-shot circuit 103 and a switch circuit 205, in which the double one-shot circuit 103 includes a first one-shot circuit 101a and a second one-shot circuit 101b. The double one-shot circuit 103 generates the first control signal 223 and the second control signal 225 according to the clock signal 221. The switch circuit 205 passes the supply voltage VDD or the ground voltage GND to the clock setting pin of the chip 219 according to the second control signal 225.

The pin setting circuit 217 further includes a buffer 215, a first resistor 209 and second resistor 211. The first resistor 209 has one end electrically connected to the switch circuit 205 and the other end receiving the supply voltage VDD. The second resistor 211 has one end electrically connected to the switch circuit 205 and the other end receiving the ground voltage GND. The buffer 215 is electrically connected to the double one-shot circuit 103 for passing the clock signal 221 to the double one-shot circuit 103. Because the capacitance of the clock driving chip 219 and the pin setting circuit 217 is large, the buffer 215 is required to drive the clock driving chip 219 and the pin setting circuit 217.

As described above, the double one-shot circuit 103 includes the first one-shot 101a and the second one-shot circuit 101b. The first one-shot circuit 101a generates the first control signal 223 according to the frequency of the clock signal 221, in which the first control signal 223 is outputted from the inverting output port of the first one-shot circuit 101a. The second one-shot circuit 101b receives the first control signal 223 outputted from the first one-shot circuit 101a and generates the second control signal 225 accordingly.

According to the characteristic of the double one-shot circuit 103 shown in this embodiment, if the period of the clock signal inputted to the double one-shot circuit 103 is greater than the delay time of the first one-shot circuit 101a, the double one-shot circuit 103 outputs logic 1, which makes the switch circuit 205 pass the supply voltage VDD to the clock setting pin. On the contrary, if the period of the clock signal inputted to the double one-shot circuit 103 is less than the delay time of the first one-shot circuit 101a, the double one-shot circuit 103 outputs logic 0, which makes the switch circuit 205 pass the ground voltage GND to the clock setting pin.

FIG. 3 shows the table of control signals generated by the double one-shot circuit according to one embodiment of the present invention. According to the table, the first control signal and the second control signal are both logic 0 if the clock signal period is 5 ns which is less than the delay time of the one-shot circuit; and the first control signal is the periodic signal and the second control signal is logic 1 if the clock signal period is 10 ns (greater than the delay time of the one-shot circuit). In other words, the logic value of the second control signal varies with the clock signal frequency, which can set the clock setting pin to a different value when the clock signal frequency changes. Thus, the clock driving chip can identify the clock signal frequencies, and the chip can work with various frequencies.

According to the above embodiments, the pin setting circuit can detect the frequency of the clock signal and set the clock setting pin according to the detected clock signal frequency, which enables the chip to work with various frequencies.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pin setting circuit for setting a clock setting pin of a chip, the pin setting circuit comprising:
   a double one-shot circuit, comprising:
      a first one-shot circuit receiving a clock signal and generating a first control signal according to the frequency of the clock signal; and
      a second one-shot circuit receiving the first control signal outputted from the first one-shot circuit and generating a second control signal accordingly; and
   a switch circuit electrically connected to the clock setting pin of the chip, wherein the switch circuit passes a supply voltage or a ground voltage to the clock setting pin according to the second control signal.

2. The pin setting circuit as claimed in claim 1, further comprising a buffer electrically connected to the double one-shot circuit for passing the clock signal to the double one-shot circuit.

3. The pin setting circuit as claimed in claim 1, further comprising:
   a first resistor having one end electrically connected to the switch circuit and the other end receiving the supply voltage; and
   a second resistor having one end electrically connected to the switch circuit and the other end receiving the ground voltage.

4. The pin setting circuit as claimed in claim 1, wherein the first control signal is constant when the clock signal works with a first period.

5. The pin setting circuit as claimed in claim 4, wherein the first control signal is a periodic signal when the clock signal works with a second period.

6. The pin setting circuit as claimed in claim 5, wherein the cycle time of the first period is less than the cycle time of the second period.

7. The pin setting circuit as claimed in claim 5, wherein the first control signal is a periodic signal and the second control signal is logic 1 when the clock signal works with the second period.

8. The pin setting circuit as claimed in claim 4, wherein the first control signal and the second control signal are logic 0 when the clock signal works with the first period.

9. A clock driving circuit, comprising:
   a clock generator for generating a clock signal;

a clock driving chip driven by the clock signal, wherein the clock driving chip has a clock setting pin; and a pin setting circuit for setting the clock setting pin, the pin setting circuit comprising:

a double one-shot circuit, comprising:

a first one-shot circuit receiving a clock signal and generating a first control signal according to the frequency of the clock signal; and a second one-shot circuit receiving the first control signal outputted from the first one-shot circuit and generating a second control signal accordingly; and a switch circuit electrically connected to the clock setting pin of the chip, wherein the switch circuit passes a supply voltage or a ground voltage to the clock setting pin according to the second control signal.

10. The clock driving circuit as claimed in claim 9, further comprising a buffer electrically connected to the double one-shot circuit for passing the clock signal to the double one-shot circuit.

11. The clock driving circuit as claimed in claim 9, further comprising:

a first resistor having one end electrically connected to the switch circuit and the other end receiving the supply voltage; and a second resistor having one end electrically connected to the switch circuit and the other end receiving the ground voltage.

12. The clock driving circuit as claimed in claim 9, wherein the delay time of the first one-shot circuit is greater than a first period of the clock signal and less than a second period of the clock signal, and the cycle time of the first period is less than the cycle time of the second period.

* * * * *